March 3, 1970  O. A. W. TICHY ET AL  3,497,884
AUTOMATIC WATER LEVEL CONTROL
Filed Feb. 6, 1968  2 Sheets-Sheet 1
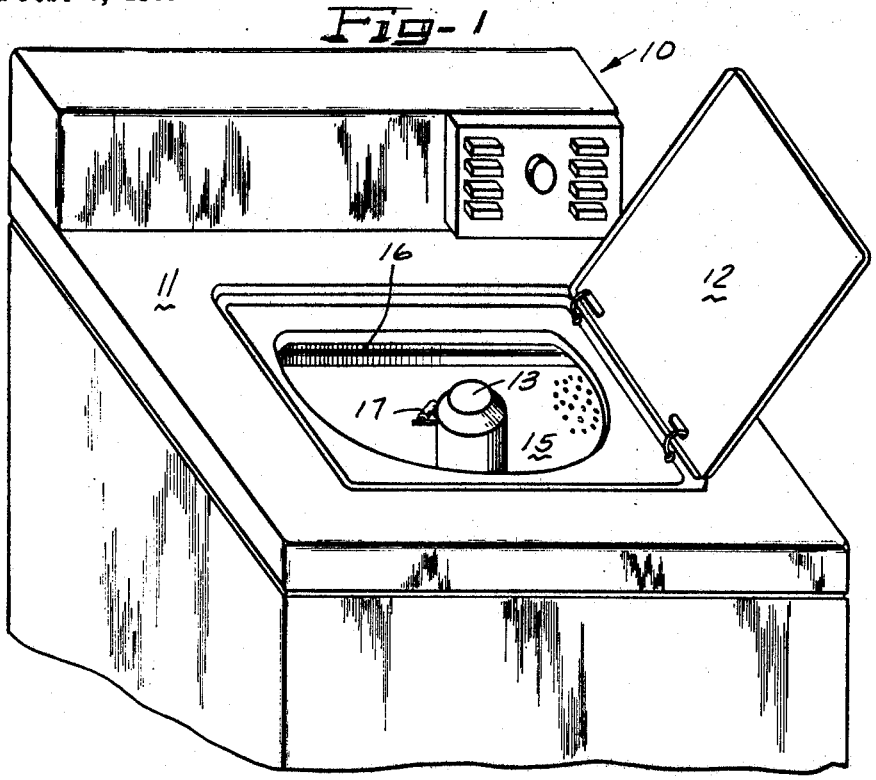
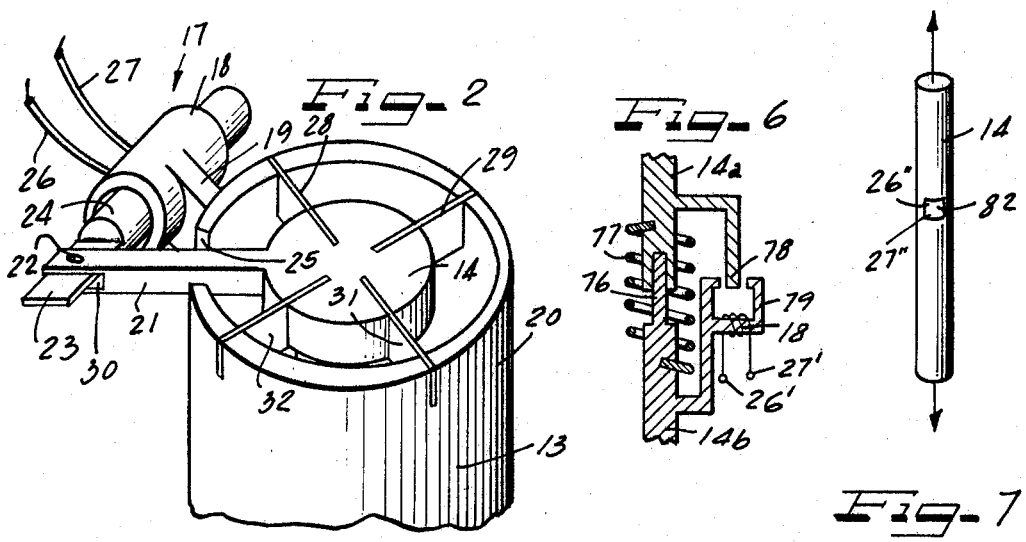
INVENTORS
OSCAR A. TICHY
JOHN A. LAUCK
BY *Hill, Sherman, Meroni, Gross & Simpson* ATTORNEYS

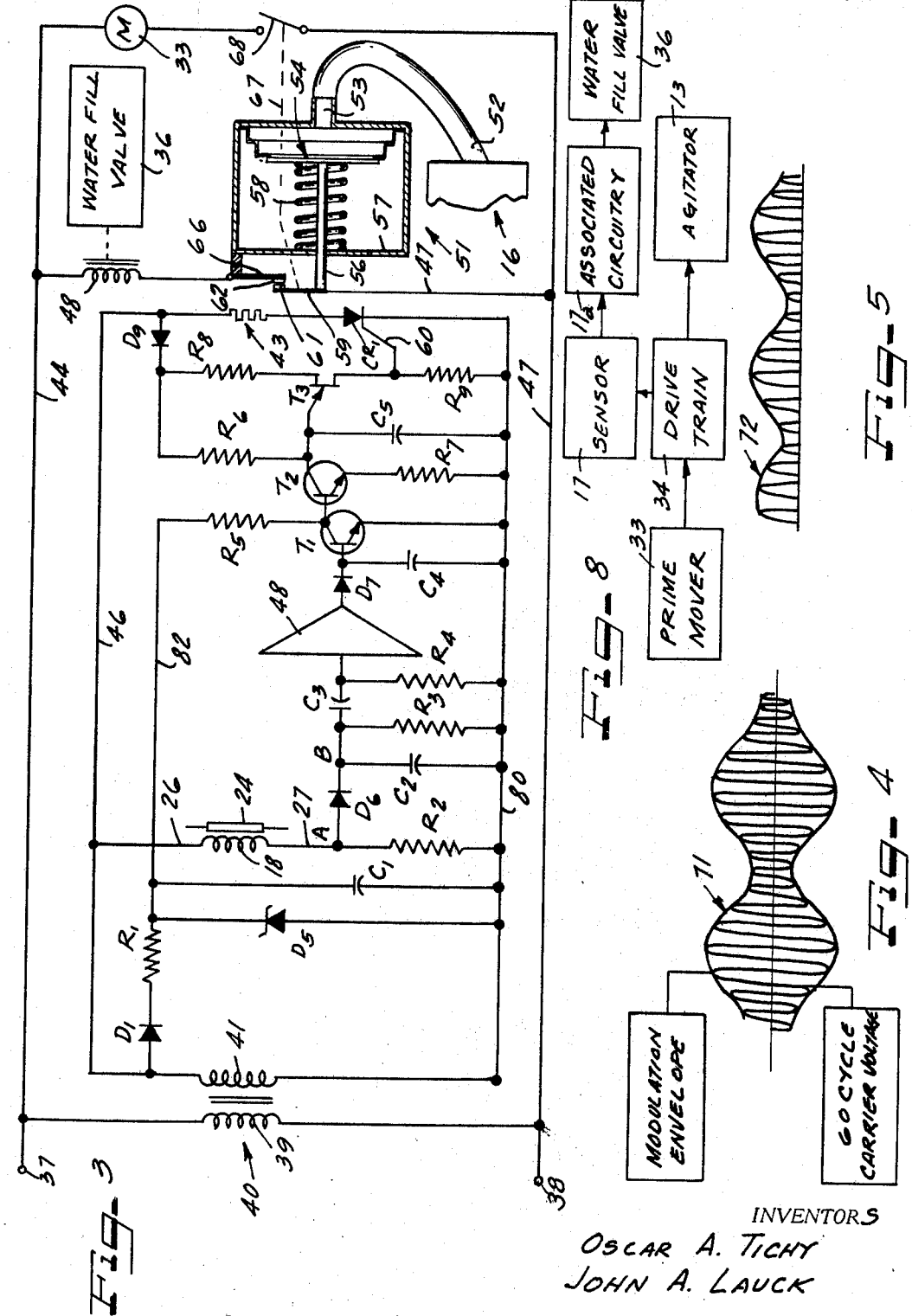

United States Patent Office 3,497,884
Patented Mar. 3, 1970

3,497,884
AUTOMATIC WATER LEVEL CONTROL
Oscar A. W. Tichy, St. Joseph, and John A. Lauck, Stevensville, Mich., assignors to Whirlpool Corporation, St. Joseph, Mich., a corporation of Delaware
Filed Feb. 6, 1968, Ser. No. 703,434
Int. Cl. D06f 31/02
U.S. Cl. 8—158                     22 Claims

ABSTRACT OF THE DISCLOSURE

Automatic washers for clothing and other articles are customarily driven by a prime mover such as an electric motor operating through a drive train. The torque which must be transmitted through the drive train to drive the agitator is dependent upon the water level in the washer and the size of the load being laundered. The present invention senses the restraining torque exerted on the agitator and controls the water level in the washer in response to the torque detected.

BACKGROUND OF THE INVENTION

Field of the invention

The invention relates to the field of automatic washing machines as for example, for clothing or other articles. In particular the invention relates to a sensing means for detecting the amount of torque exerted upon the agitator, which is dependent on the water level and the size of the clothing load in the tub of the washer, and a control to vary the water level in the washing machine in response to the sensor output.

Description of the prior art

Automatic water level controls in washers have been previously known as shown by Patents 3,030,790; 3,065,618 and 3,093,841, which are assigned to the assignee of the present invention. Patent No. 3,030,790, for example, discloses an apparatus with a torque sensing switch connected to the tank of the washer. This switch is actuated upon sensing a predetermined amount of movement of the tank resulting from torque transmitted from the agitator through the articles in the tank to control level of liquid in the tank. Patent No. 3,065,618 also discloses a liquid level control means for washing machines, wherein the torque transmitted from the agitator to the basket and tank through the clothing load is detected and used to control a water level switch. Patent No. 3,093,841 detects the torque transmitted to the tank of the washer caused by a low level of liquid in the washer to control the liquid level.

SUMMARY OF THE INVENTION

The present invention relates to an automatic washer with an agitator driven by a prime mover through a drive train, which might for example include belts or gears, a clutch and various shafts. The agitator is oscillated within the load being laundered, and the amount of torque transmitted by the individual drive train components is proportional to the restraining torque exerted on the agitator by the clothing. The restraining torque, for any given clothes load is dependent on the water level in the washer tub. The present invention comprises: utilizing a senor in the drive train of the washer between the prime mover and the agitator so as to detect the torque transmitted between the prime mover and the agitator. Prior inventions have detected movement of the tank or basket of the washer in response to torque transmitted thereto, whereas the present invention detects the torque in the drive train between the prime mover and the agitator. Torque sensors such as mechanical or electrical strain gauges or sensors detecting relative motion between drive train components resulting from transmitted torque are utilized between the prime mover and the agitator to detect the torque exerted on the agitator when the water level is lower than it should be to control the water level.

Other objects, features and advantages of this invention will become apparent from the following description when taken in conjunction with the accompanying drawings.

BRIEF DESCRIPTION OF THE DRAWINGS

FIGURE 1 is an isometric view of the top of a washer with the washer door open.

FIGURE 2 is a detailed view of the top of the agitator, with a torque-sensing sensor mounted thereon.

FIGURE 3 is a schematic circuit diagram illustrating the sensor and associated control circuitry.

FIGURES 4 and 5 illustrate control signals generated at various points within the FIGURE 3 control circuit.

FIGURE 6 is a side sectional view of a modification of the invention.

FIGURE 7 is a view of a further modification of the invention, and FIGURE 8 is a schematic block diagram of an agitator, drive train and prime mover.

DESCRIPTION OF THE PREFERRED EMBODIMENTS

The agitator of an automatic washer is customarily driven by an electric motor or other prime mover, operating through a drive train. The drive train may take various configurations and may include, for example, belts, various gears, a clutch, and various shafts. As the agitator is oscillated within the load being laundered, the mount of torque transmitted by the individual drive train components is proportional to the restraining torque exerted on the agitator by the clothing. This restraining torque, for any given clothes load, is dependent on the water level in the washer's tub. Thus the present invention utilizes a sensing means between the prime mover and the agitator to sense the torque exerted by the load on the agitator to control the water level in the washer. For example, FIGURE 8 illustrates a prime mover 33 which is connected through suitable means to a drive train 34 which in turn drives an agitator 13. A sensing means 17 is associated with drive train 34 and generates a signal proportional to the torque transmitted therethrough. The signal is then amplified by associated circuitry 17a which controls energization of a water fill valve 36. Sensing means 17 may be mounted to sense the torque transmitted through any component in the drive train 34, and it is to be realized that FIGURE 8 is a schematic block diagram illustrating this principle.

FIGURE 1 illustrates the upper portion of an automatic washer 10 which has a lid 12 which closes against the top 11 of the washer. A tub 16 and a perforate basket 15 are mounted within the washer, and an agitator 13 is mounted within the washer so as to oscillate back and forth. A torque-sensing means 17 in accordance with this invention is mounted between the agitator 13 and the drive shaft 14 as more clearly disclosed in FIGURE 2.

FIGURE 2 is an enlarged blownup view of the end of the agitator 13 and discloses the drive shaft 14 and upper portion 20 of the agitator 13. The drive shaft 14 is part of the drive train 34 of the washer and is driven by a motor through an appropriate transmission. As shown in FIGURE 2, the agitator 13 is not rigidly attached to the drive shaft, but is connected by leaf springs 28, 29, 31 and 32 which extend between the shaft 14 and the top portion 20 of the agitator. The four leaf springs support and position the agitator as well as transmit driving torque to it from the drive shaft 14. This allows the drive shaft 14 to twist slightly before the agitator 13 begins rotating. Thus, each time the direction of rotation of agitator drive shaft 14 is reversed, it twists slightly within agitator 13. If a large load of clohing is located in the basket 15 and an insufficient quantity of water is in the tub and basket, the clothing tends to bind the agitator 13 by tangling with its vanes. This exerts considerable restraining torque on the agitator and thus agitator drive shaft 14 twists through a considerable angle before overcoming the restraining torque and rotating agitator 13. If the water level within basket 15 is sufficient for the clothing load being laundered, less restraining torque is exerted on the vanes of agitator 13 and drive shaft 14 twists only slightly as the agitator is reversed.

The amount of twist upon reversal at the end of each stroke between drive shaft 14 and the agitator 13 is transmitted by way of a lever 21 which extends through a slot 25 formed in the upper portion 20 of the agitator One end of arm 21 is rigidly attached to shaft 14 so that it rotates with it and the other end is formed with a slot 30 through which an end 23 of a magnetic core 24 extends. A pin 22 extends through the slotted portion of arm and end 23 so that the core 24 moves with the arm 21. Core 24 extends through coil 18 which is rigidly attached by support 19 to the upper portion 20 of the agitator. Leads 26 and 27 extend from the coil 18. The coil 18 and core 24 and arm 21 comprise a sensing means 17 for producing an electrical signal in response to movement of the drive shaft 14 relative to the agitator 13. Thus, if agitator 13 twists a considerable angular distance relative to drive shaft 14, the core 24 moves a considerable longitudinal distance within pickup coil 18 and the inductance of the coil will be changed. This signal is transmitted via leads 26 and 27 to the control circuitry of the invention.

FIGURE 3 illustrates the control circuitry of the invention. A pair of terminals 37 and 38 are connected to a suitable alternating power supply, as for example 120 volts. A dropping transformer 40 has its primary 39 connected between terminals 37 and 38 and has its secondary 41 connected to the anode of a diode $D_1$. A current limiting resistor $R_1$ is connected to the cathode of the diode and to a filter capacitor $C_1$ which has its other side connected to the line 80 on the other side of the transformer. A Zener diode $D_5$ is connected across the capacitor $C_1$. A lead 46 has one end connected to the secondary 41 of the transformer 40 and is connected to one side of the coil 18. The other side of coil 18 is connected to point A which is connected through a resistor $R_2$ to the line 80 on the other side of the transformer. A diode $D_6$ has its anode connected to point A and its cathode connected to a capacitor $C_3$. The other side of capacitor $C_3$ is connected to the input of an amplifier 48. The output of the amplifier is connected to the anode of a diode $D_7$ which has its cathode connected to the base of a transistor $T_1$. The point between diode $D_6$ and condensor $C_3$ is labelled point B and a condenser $C_2$ and resistor $R_3$ are connected in parallel between point B and lead 80. A resistor $R_4$ is connected between the input of the amplifier 48 and lead 80. A capacitor $C_4$ is connected between the base of transistor $T_1$ and lead 80. A resistor $R_5$ is connected between the collector of transistor $T_1$ and a lead 82. A transistor $T_2$ has its base connected to the collector of transistor $T_1$. A resistor $R_7$ is connected between the emitter of transistor $T_2$ and lead 80. A capacitor $C_5$ is connected between lead 80 and the collector of transistor $T_2$. A unijunction transistor $T_3$ has its emitter electrode connected to the collector of transistor $T_2$. The base 1 electrode of the unijunction $T_3$ is connected through a resistor $R_9$ to the lead 80. The base 2 electrode of the unijunction $T_3$ is connected through the series connected resistors $R_8$ and $R_6$ to the collector of transistor $T_2$. A diode $D_9$ is connected between the junction between resistors $R_6$ and $R_8$ and lead 46. A heater 43 is connected between lead 46 and the anode of a thyristor CR. The cathode of thyristor CR is connected to lead 80. The gate electrode 60 of thyristor CR is connected to one side of resistor $R_9$.

A pressure switch designated generally as 51 comprises a chamber 57 formed into two portions by a diaphragm 54. One side of the diaphragm 54 is connected by the port 53 to an air pressure chamber 52 formed on the side wall of tub 16 in the washer 10. A push rod 56 is connected to the diaphragm 54 and is biased by a spring 58 in a first direction. The push rod 56 engages a contact arm 59 of a switch.. Contact arm 59 has an electrical contact 61 which mates with an electrical contact 62 carried on bimetallic arm 66. Contact arm 59 is connected to lead 47 and bimetallic arm 66 is connected to a valve control solenoid 48 which has its other side connected to lead 44. Water fill valve 36 is controlled by the solenoid 48. Drive motor 33 for the washer has one side connected to lead 44 and the other side connected to a switch 68 which has its other side connected to lead 47. A mechanical linkage 67 extends from arm 59 to switch 68.

In opertaion, upon initiation of the washing cycle, the machine's water fill valve 36 is opened by solenoid 48 through normally closed contacts 61 and 62. The drive motor 33 is not energized at this time because the switch 68 is open and thus the agitator does not move. As the water level rises within the tub 16, air pressure is transmitted from the tub 16 through the port 53. This moves diaphragm 54 to the left relative to FIGURE 3 such that push rod 56 moves contact arm 59 so that the contact 61 moves out of contact with contact 62. Movement of push rod 56 also acuates linkage 67 which closes switch 68 to start motor 33. This drives the agitator 13 in an oscillatory fashion. If insufficient water is present in the tub 16, the agitator drive shaft 14 twists through a large angular degree relative to the agitator 13 each time its direction of rotation is reversed. This slides the core 24 longitudinally within pickup coil 18 to produce an electrical signal on leads 26 and 27.

As shown in FIGURE 3, lead 27 connects to point A and lead 26 connects to lead 46. Dropping transformer 40 converts the 120 volts A.C. to a lower alternating voltage such as for example 12 volts which is impressed across series connected pick-up coil 18 and resistor $R_2$. Movement of core 24 due to the relative angular motion between shaft 14 and agitator 13 causes the core 24 to move, thus modulating the A.C. signal in the coil 18. This is illustrated in FIGURE 4 wherein the 60-cycle carrier voltage is modulated by movement of the core to form a modulation envelope 71. Diode $D_6$ next half-wave rectifies the 60-cycle carrier voltage and the modulation envelope 72 shown in FIGURE 5 results. Resistor $R_3$ and condenser $C_2$ filter out the 60-cycle carrier voltage from the wave form shown in FIGURE 5, and a pulsating signal voltage exists across condenser $C_2$ which has a frequency corresponding to the modulation envelope 72 of the wave form shown in FIGURE 5. This signal voltage is A.C. coupled via capacitor $C_3$ into amplifier 48. The output of amplifier 48 is transmitted by way of diode $D_7$ to a filter capacitor $C_4$, which provides base current to transistor $T_1$ which then saturates. Transistor $T_1$ then shunts base drive from transistor $T_2$ driving it out of conduction. With transistor $T_2$ out of conduction, capacitor $C_5$ now charges during each positive going portion of the A.C. signal appearing on line 46 through a diode $D_9$ and resistor $R_6$. Thus unijunction transistor $T_3$ is fired by the charge developed on capacitor $C_5$ and a pulse is generated across resistor $R_9$ thereby driving thyristor $CR_1$ into conduction. This applies power to the heater 43 and after a brief time delay bimetallic arm 66 moves to the left relative to FIGURE 3 until it engages contact 61 and causes it to engage contact 62. This energizes solenoid 48 and additional water will be admitted to the tub by the water fill valve 36. When sufficient water is present in the tub, the core 24 no longer oscillates within pickup coil 18. This terminates the signal to the amplifier 48. Transistor $T_1$ goes out of conduction causing transistor $T_2$ to go into conduction, which shunts capacitor $C_5$. With capacitor $C_5$ shunted to ground unijunction transistor $T_3$ no longer fires and the thyristor $CR_1$ is rendered non-conductive. This terminates power to the heater 43 and the bimetallic arm 66 cools so as to move contact 62 away from contact 61. This opens solenoid 48 to turn off the water fill valve 36.

It should be noted that any sensing means which produces an output proportional to the torque being transmitted through the drive train to the agitator could be substituted for the preferred embodiments shown in the figures. FIGURE 6 for example shows another embodiment wherein the drive shaft 14 is formed of two portions, 14a and 14b, which are held in axial alignment by a pin 76. A torsion spring 77 allows portions 14a and 14b to twist slightly relative to each other but holds them together. As portion 14a twists relative to section 14b, an iron slug 78 carried by portion 14a moves in a gap formed in a C-frame 79 carried by portion 14b. This varies the reluctance of the magnetic path of the C-frame 79 and the inductance of a pickup coil 18 is varied. Leads $26^1$ and $27^1$ supply the output from coil 18, and these are connected in the FIGURE 3 circuit at the same location as are leads 26 and 27 of the embodiment shown in FIGURE 2.

FIGURE 7 illustrates a further embodiment wherein the drive shaft 14 has a strain gauge 82 attached to its surface so that as the drive shaft 14 twists due to torque being transmitted through it, strain gauge 82 is distorted which produces an output voltage on leads $26^{11}$ and $27^{11}$. This voltage will be fed into the circuitry of FIGURE 3 at the same place that the voltage appearing across leads 26 and 27 of the embodiment shown in FIGURE 2.

It should also be realized that the torque sensing structures could be associated with components in the drive train other than the agitator drive shaft. For example, strain gauges could be used with the motor drive shaft or gears in the transmission. Even belt tension sensing means could be used. For example, a conductive rubber belt whose resistance varies with amount of stretch could be utilized to produce an output signal proportional to torque.

The water level control provides the correct amount of water for a given load regardless of the type of fabric being laundered or the load size. This insures optimum washing action since agitation of clothing in too little water may damage fabrics whereas agitation of fabrics in too much water does not allow proper washing action of fabrics by the agitator.

Hot water is saved because the tub will not be filled above the level necessary to launder the clothing. This saves in both home water and fuel consumption.

Laundering detergent is saved since the amount of detergent needed is proportional to water level.

The water level control contributes to longer life of the washer since torque transmitted by the agitator to the basket and tub through the clothing load is reduced to a minimum.

The principles of the invention explained in connection with the specific exemplifications thereon will suggest many other applications and modifications of the same. It is accordingly desired that in constructing the breadth of the appended claims they shall not be limited to the specific details shown and described in connection with the exemplifications thereof.

The embodiments of the invention in which an exclusive property or privilege is claimed are defined as follows:

1. In a washing machine having a container for material to be washed and agitation means for said material and driving means comprising a prime mover and a drive train coupled to the agitation means,
   means for adding liquid to the container, and
   torque sensing means constructed and connected to measure the torque in the drive train between the driving means and the agitation means and connected to the means for adding liquid to the container to control the liquid level in the container as a function of the torque exerted by the load on the agitation means.

2. In a washing machine having a container for material to be washed and agitation means for said material and driving means coupled to the agitation means,
   means for adding liquid to the container, and
   torque sensing means connected to measure the torque between the driving means and the agitation means and connected to the means for adding liquid to the container to control the liquid level in the container,
   an agitator drive shaft driven by the driving means, the agitator drive shaft flexibly coupled to the agitation means, and the torque sensing means connected between the agitator drive shaft and the agitation means.

3. Apparatus according to claim 2 wherein the torque sensing means is electromagnetic.

4. Apparatus according to claim 2 wherein the agitation means is hollow and the agitator drive shaft is concentrically mounted in the agitation means,
   flexible means connected between the agitator drive shaft and the agitation means,
   the sensing means comprising a pair of magnetic means with one magnetic means attached to the agitator drive shaft and one magnetic means attached to the agitation means.

5. Apparatus according to claim 4 wherein one of the magnetic means is a coil and the other is a core.

6. Apparatus according to claim 5,
   an arm with one end attached to the agitator drive shaft and its other end pivotally attached to the one magnetic means to move it relative to the other magnetic means in accordance with torque between the agitator drive shaft and the agitation means.

7. Apparatus according to claim 1 wherein said drive train comprises an agitator drive shaft driven by said prime mover and coupled to the agitation means,
   and the torque sensing means connected to measure the torque transmitted by the agitator drive shaft.

8. In a washing machine having a container for material to be washed and agitation means for said material and driving means coupled to the agitation means,
   means for adding liquid to the container, and
   torque sensing means connected to measure the torque between the driving means and the agitation means and connected to the means for adding liquid to the container to control the liquid level in the container,
   an agitator drive shaft driven by the driving means and coupled to the agitation means,
   and the torque sensing means connected to measure the torque transmitted by the agitator drive shaft,
   said torque sensing means comprising a strain gauge.

9. In a washing machine having a container for material to be washed and agitation means for said material and driving means coupled to the agitation means,
   means for adding liquid to the container, and
   torque sensing means connected to measure the torque between the driving means and the agitation means and connected to the means for adding liquid to the container to control the liquid level in the container,
   an agitator drive shaft driven by the driving means and coupled to the agitation means,
   and the torque sensing means connected to measure the torque transmitted by the agitator drive shaft,
   said agitator drive shaft being formed of two sections, said sections being mounted for limited angular motion relative to each other,
   spring biasing means attached to the two sections, and the torque sensing means connected between the two sections to measure torque in the agitator drive shaft.

10. Apparatus according to claim 9 wherein the torque sensing means comprises a pair of magnetic means with one attached to the first section of the drive shaft and the other connected to the other section of the drive shaft.

11. Apparatus according to claim 10 wherein one magnetic means comprises a coil and its magnetic circuit, and the other magnetic means varies the reluctance of said magnetic circuit as the two sections of the drive shaft move angularly relative to each other.

12. Apparatus according to claim 11 wherein the magnetic circuit includes a gap, and the other magnetic means comprises magnetic material which moves relative to the gap.

13. In a washing machine having a container for material to be washed and agitation means for said material and driving means coupled to the agitation means,
means for adding liquid to the container, and
torque sensing means connected to measure the torque between the driving means and the agitation means and connected to the means for adding liquid to the container to control the liquid level in the container,
said means for adding liquid to the container including
a heater,
a power source,
the torque sensing means connected in circuit with the power source and the heater to control the heat output as a function of torque,
a pressure responsive switch,
a pressure transducer in the container responsive to liquid level coupled to the pressure responsive switch,
a temperature responsive member forming a part of the pressure switch and positioned to receive heat energy from the heater, and switch contacts controlled by the temperature responsive member.

14. Apparatus according to claim 13,
pressure responsive means forming a part of the pressure switch and operative to control the switch contacts as a function of pressure.

15. Apparatus according to claim 14 wherein the pressure responsive means comprises a diaphragm.

16. Apparatus according to claim 13 wherein the temperature responsive member comprises a bimetallic strip.

17. Apparatus according to claim 13, a liquid control valve and the switch contacts connected in circuit with the control valve to supply liquid to the container.

18. Apparatus according to claim 17, a solenoid connected to the switch contacts and to the liquid control valve.

19. Apparatus according to claim 13 wherein the torque sensing means comprises an electronic gate circuit connected to the output of the torque sensing means and the gate circuit connected to the power source and the heater to control the heater in response to the output of the torque sensing means.

20. Apparatus according to claim 19 wherein said gate circuit includes a thyristor controlled rectifier and biasing means for said thyristor.

21. Apparatus according to claim 20 wherein the torque sensing means produces an alternating output signal when torque is high, and means for detecting the alternating signal to supply it to the biasing means to turn the silicon controlled rectifier on.

22. The method of controlling the liquid level in a washing machine having an agitator and a prime mover coupled by a drive train comprising detecting the torque changes exerted by the load on the agitator by measuring the torque in the drive train and controlling the liquid level to maintain the torque transmitted through the drive train below a predetermined value.

References Cited

UNITED STATES PATENTS 3,359,766  12/1967  Haas _____ 68—12 X

WILLIAM I. PRICE, Primary Examiner

U.S. Cl. X.R.

68—12, 207; 137—387